(12) United States Patent
Washeleski et al.

(10) Patent No.: US 6,396,259 B1
(45) Date of Patent: May 28, 2002

(54) ELECTRONIC THROTTLE CONTROL POSITION SENSOR

(75) Inventors: John M. Washeleski, Cadillac; Peter H. Strom; David W. Shank, both of Big Rapids; Ronald L. Ballast, McBain, all of MI (US)

(73) Assignee: Nartron Corporation, Reed City, MI (US)

( * ) Notice: Subject to any disclaimer, the term of this patent is extended or adjusted under 35 U.S.C. 154(b) by 0 days.

(21) Appl. No.: 09/325,883

(22) Filed: Jun. 4, 1999

Related U.S. Application Data
(60) Provisional application No. 60/121,457, filed on Feb. 24, 1999.

(51) Int. Cl.[7] .................................................. G01B 7/30
(52) U.S. Cl. .............................. 324/207.22; 324/207.2; 324/207.12
(58) Field of Search ........................ 324/207.11, 207.12, 324/207.2; 327/357, 207.25, 202, 252; 338/32 H

(56) References Cited

U.S. PATENT DOCUMENTS

| | | |
|---|---|---|
| 5,159,268 A * | 10/1992 | Wu .......................... 324/207.2 |
| 5,332,965 A | 7/1994 | Wolf et al. |
| 5,497,081 A | 3/1996 | Wolf et al. |
| 5,757,181 A | 5/1998 | Wolf et al. |
| 6,011,422 A * | 1/2000 | Koglin et al. ................ 327/357 |

* cited by examiner

Primary Examiner—Jay Patidar
(74) Attorney, Agent, or Firm—Brooks & Kushman P.C.

(57) ABSTRACT

An electronic position sensor for determining position as a function of magnetic flux density. The position sensor includes a magnetic flux sensor and a movable magnet, the sensed magnetic flux density by the magnetic sensor being a function of the relative air gap, magnet thickness, and magnetic field direction between the magnet and the magnet sensor element. The relationship between the magnetic flux density sensed by the magnetic sensing element and the positional disposition of the moved magnet component of the sensor is geometrically defined and optionally linear between two defined points of the range of articulation or motion of the sensor. The magnetic flux sensing element is a Hall-effect integrated circuit, magnetoresistor, magnetodiode, magnetotransistor, or similar sensing element with associated electronic circuitry having adjustable or programmable features including ratiometry, gain, offset voltage, temperature coefficient, and output signal range limiting.

18 Claims, 9 Drawing Sheets

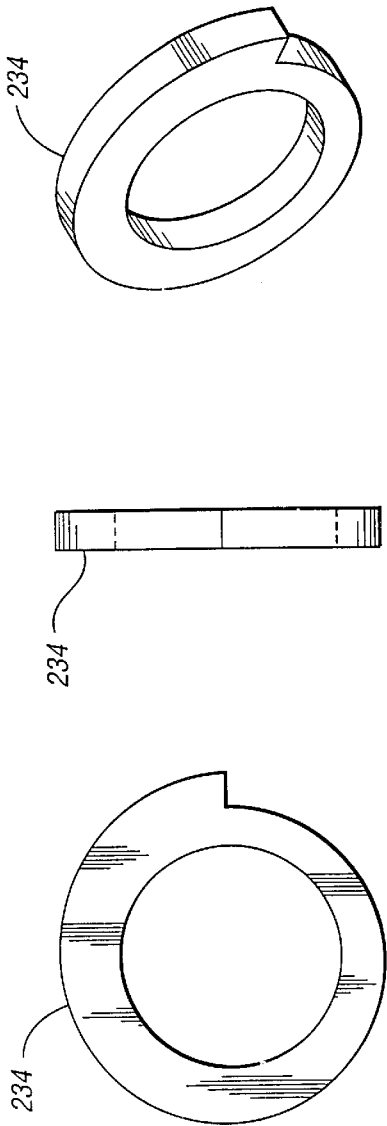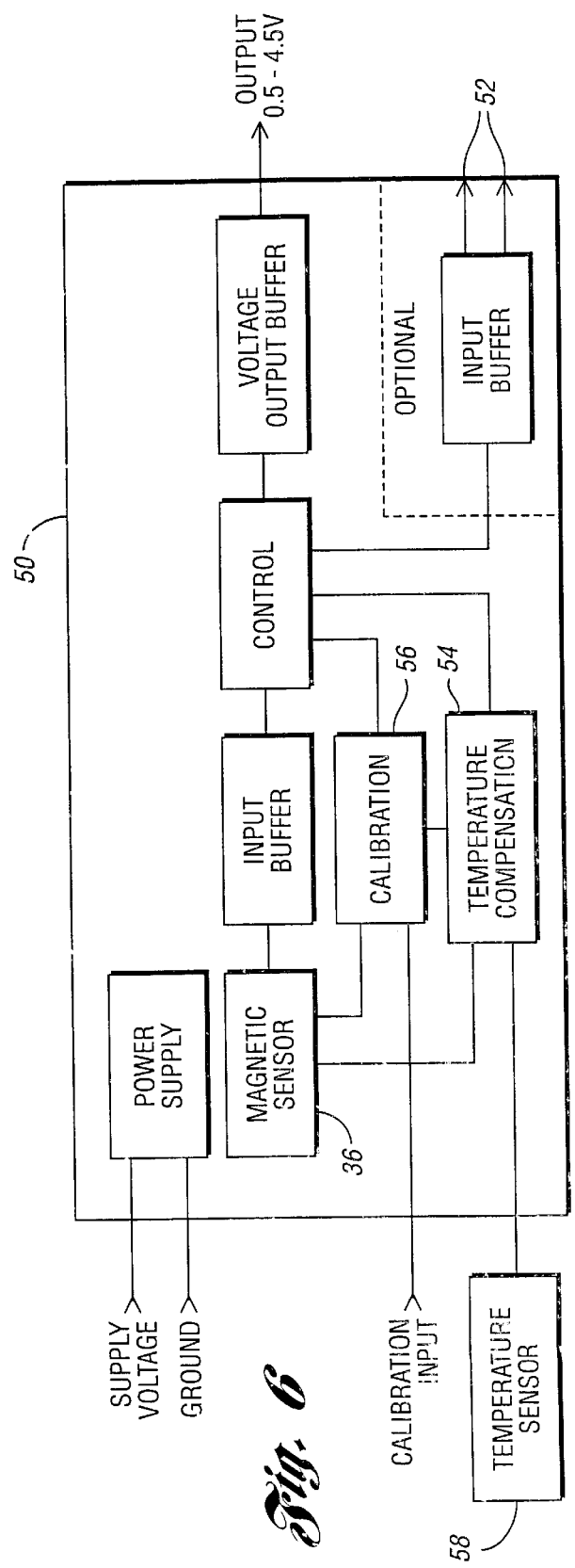
Fig. 5a  Fig. 5b  Fig. 5c
Fig. 6

ELECTRONIC THROTTLE CONTROL POSITION SENSOR

CROSS-REFERENCE TO RELATED APPLICATIONS

This application claims the benefit of U.S. provisional application Ser. No. 60/121,457 filed Feb. 24, 1999.

BACKGROUND OF THE INVENTION

1. Field of the Invention

This invention relates generally to electronic throttle control position sensors and more specifically to such sensing devices that determine position as a function of sensed magnetic flux density.

2. Background Art

Position-sensing devices are well-known in the art. These range in sophistication from local mechanical repeaters to remote electronic analog and digital devices. Early methods used a system having a "look-up table." This required a measured value to be "looked up," electronically or mechanically, and converted to a desired value. Understandably, this method is too expensive, inaccurate and slow to find much application today.

An alternative and low-cost method for position sensing uses an incremental encoder. Limited resolution and the potential for loss of position information as a result of detrimental noise or temporary power loss severely limit its consideration for critical applications. Absolute digital encoder methods typically require a multiplicity of sensing elements at significant cost. Contacting types of sensing elements suffer from mechanical wear-related problems that can detrimentally affect signal integrity and device longevity.

More recent methods for position sensing have used devices that determine position as a function of magnetic flux density. Commercially producing a sufficiently accurate and precise analog sensor for use in determining physical positions in that manner has proved to be difficult. The effects of variations in input offset, input gain, temperature, output slope and output signal limiting placed severe constraints on the manufacturing of such sensing devices in an efficient and cost-effective manner using high-volume, automated techniques. Sensing devices made under these constraints tended to be either inaccurate and imprecise or costly or both.

SUMMARY OF THE INVENTION

The electronic position sensor for sensing the position of a movable member includes a magnetic flux sensor. The latter sensor preferably includes a programmable linear ratiometric Hall-effect integrated circuit that has programmable gain, offset voltage and temperature compensation. The invention also includes a magnet, which may be a permanent magnet or an electromagnet, to provide a defined magnetic field. A magnetic flux sensor is disposed proximate the magnet, forming a gap therebetween.

The magnetic flux sensor includes an electronic circuit having programmable ratiometry, gain, offset voltage and temperature compensation. Relative motion is initiated between the magnet and the magnetic flux sensor in response to movement of the movable member. The relationship between the position of the movable member and an electronic circuit output in response to magnetic characteristics sensed by the magnetic flux sensor results in a linear function between two defined points within a specific range of at least one magnetic flux density, the amplitude of an electronic circuit output signal representing movable member position.

The magnet is typically rotatable about an axis of rotation in response to movement of a movable member, which is typically an automobile accelerator pedal lever arm. The magnetic flux density between the magnet and the magnetic flux sensor is a function of the angular disposition of the magnet and thus of the movable member. The relationship between the magnetic flux density sensed by the magnetic flux sensor and the position of the movable member need only be linear or some specified geometric function between two defined points within a specific range of magnetic flux density. Usually, a linear overall transfer function is preferred for the sensed variation of magnetic flux density versus rotation or translation.

In some cases, nonlinear deviations of system parameters, such as the cross sectional area of a fuel tank versus depth, can be linearized by implementation of a corresponding and opposite sense nonlinear magnetic transfer function such that the resultant overall transfer function is linear. Mechanical linkages, cams, and the like can also produce nonlinearity in the relative motion of the magnetic component and the magnetic field sensing component of the invention. Likewise, nonlinear deviations due to various mechanical articulation components of the device can be compensated, and thus canceled, by implementation of an appropriate but opposite nonlinear magnetic transfer function resulting in the typically-desired overall linear transfer function for the device.

In a first preferred embodiment, the magnet is a permanent magnet that has a configuration of a circular plate of uniform thickness. The magnet is magnetized in an axial direction relative to the axis of rotation of the magnet, and the plane of the magnet is disposed at an oblique angle relative to the axis of rotation of the magnet. It is rotatably mounted so that it is spaced from the magnetic flux sensor in an axial direction relative to the axis of rotation of the magnet. A rotation of the magnet varies the gap between it and the magnetic flux sensor, thus varying the flux sensed by the magnetic flux sensor as a function of the angular disposition of the magnet.

In a second preferred embodiment, the magnet is typically a permanent magnet that has a configuration of a linear cam ring. The magnet is magnetized in a radial direction relative to the axis of rotation of the magnet. It is rotatably mounted so that it is spaced from the magnetic flux sensor in a radial direction relative to the axis of rotation of the magnet. A rotation of the magnet varies the gap between it and the magnetic flux sensor, thus varying the flux sensed by the magnetic flux sensor as a function of the angular disposition of the magnet.

BRIEF DESCRIPTION OF DRAWINGS

A more complete appreciation of the invention and many of the attendant advantages thereof may be readily obtained by reference to the following detailed description when considered with the accompanying drawings in which like reference characters indicate corresponding parts in all the views, wherein:

FIG. 5A is an axial view of the radially magnetized cam magnet of FIG. 4;

FIG. 5B is a radial view of the radially magnetized cam magnet of FIG. 4;

FIG. 5C is an isometric view of the radially magnetized cam magnet of FIGS. 5A and 5B;

FIG. 6 is a mixed block diagram of a programmable linear magnetic flux density sensor showing optional communication bus outputs;

BEST MODE FOR CARRYING OUT THE INVENTION

Figure 1A:
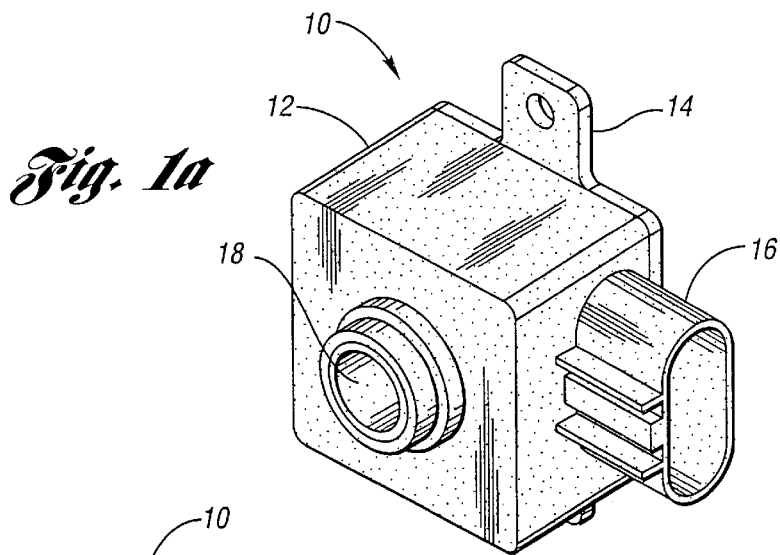
FIG. 1A is an isometric view of the outside of the electronic throttle control position sensor of the present invention.
Figure 1D:
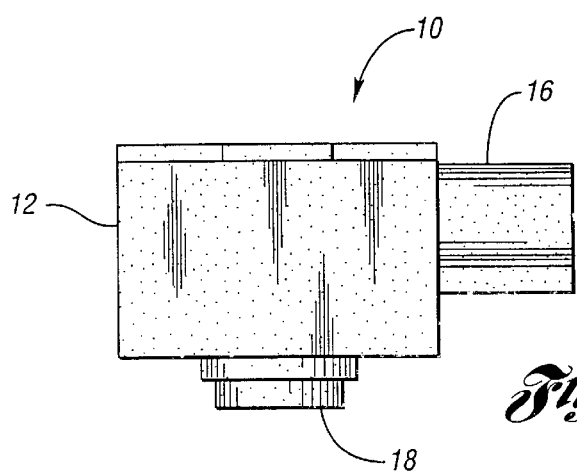
FIG. 1D is a view of the electronic throttle control position sensor of FIG. 1A and provides a side view of the electrical connector and of the automotive mating drive feature of respective FIGS. 1B and 1C.
Figure 1C:
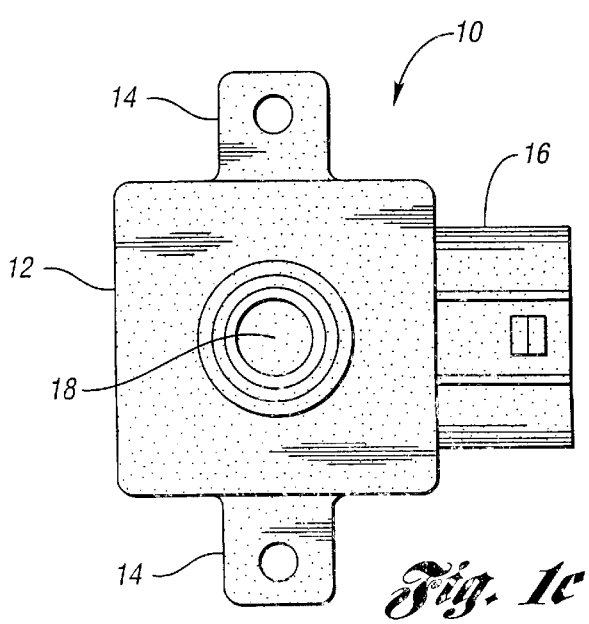
FIG. 1C is a view showing a typical automotive mating drive feature of the electronic throttle control position sensor of FIG. 1A.
Figure 1B:
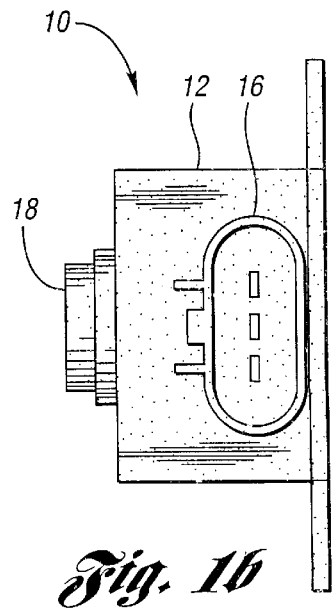
FIG. 1B is a view of an electrical connector end of the electronic throttle control position sensor of FIG. 1A.

FIGS. 1A, 1B, 1C and 1D of the drawings show four views of an electronic throttle control position sensor, generally indicated by the reference numeral 10, secured in an environmental housing 12. The housing 12 has mounting tabs 14 extending therefrom for mounting the housing 12 in place with bolts (not shown) or the like. Mounted on the housing 12 is an automotive-style electrical connector 16 for conducting electrical power to the electronic throttle control position sensor and for conducting output signals therefrom. Also shown is an automotive-style mechanical-driver interface 18 for connecting the electronic throttle control position sensor 12 to an automotive accelerator pedal mechanism (FIGS. 8A, 8B, 9A and 9B).

Figure 2:
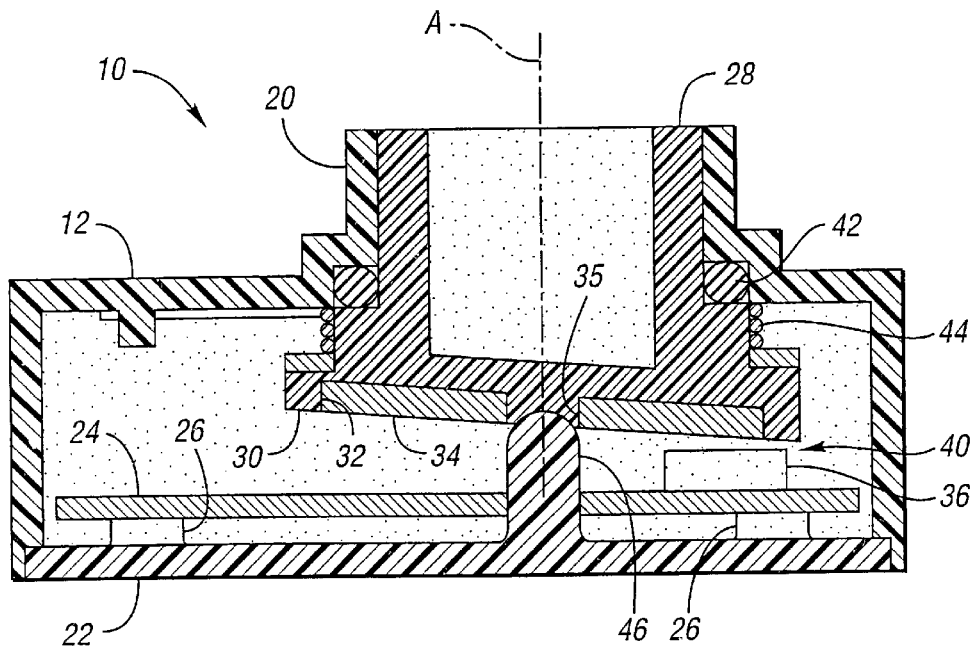
FIG. 2 is a sectioned view of a portion of a first preferred embodiment of the electronic throttle control position sensor represented by FIG. 1A.

FIG. 2 shows in section a portion of a first preferred embodiment of the electronic throttle control position sensor 10. It includes a housing 12 that has a tubular magnet rotor guide 20 extending therefrom. Disposed opposite the magnet rotor guide 20 is a housing plate 22, which provides access to components located within the housing 12. A printed circuit board 24 is secured to standoffs 26 extending from the housing plate 22.

A magnet rotor 28 extends through the magnet rotor guide 20 and is rotatable therein about a rotation axis A. An enlarged, magnet mounting end 30 of the magnet rotor 28 has a circular recess 32 in which is fixedly disposed a magnet 34, the rotation of which is also about the axis of rotation A. The magnet 34 is typically a permanent magnet having a configuration of a circular plate of uniform thickness and having a circular aperture 35 extending centrally therethrough. The magnet 34 is magnetized in the axial direction. The plane of the magnet 34 is disposed at an oblique angle relative to the axis of rotation A and therefore has the motion of a swash plate when the magnet rotor 28 is rotated.

A magnetic flux sensor 36 is mounted on the printed circuit board 24 so that a gap 40 is formed between the magnetic flux sensor 36 and the magnet 34 in an axial direction relative to rotation axis A. Due to the oblique angle the plane of the magnet 34 makes with the rotation axis A, a rotation of the magnet varies the gap 40 between it and the magnetic flux sensor 36, thus varying the flux sensed by the magnetic flux sensor 36 as a function of the angular disposition of the magnet 34.

The magnet rotor 28 is surrounded at a stepped portion thereof by an annular elastomeric seal 42. It is surrounded at another stepped portion thereof by a helical spring 44 that resiliently biases the magnetic rotor 28 toward the magnetic flux sensor 36 with sufficient force to overcome peak vibrational and frictional forces inherent in the application. A support member 46 extends from the housing plate 22 and toward the magnet. The support member 46 has a circular cross section the diameter of which is slightly larger than that of the diameter of the circular aperture 35 in the magnet 34. The free end of the support member 46 is rounded to accommodate the swash-plate motion of the magnet 34 when it rotates.

Figure 3:
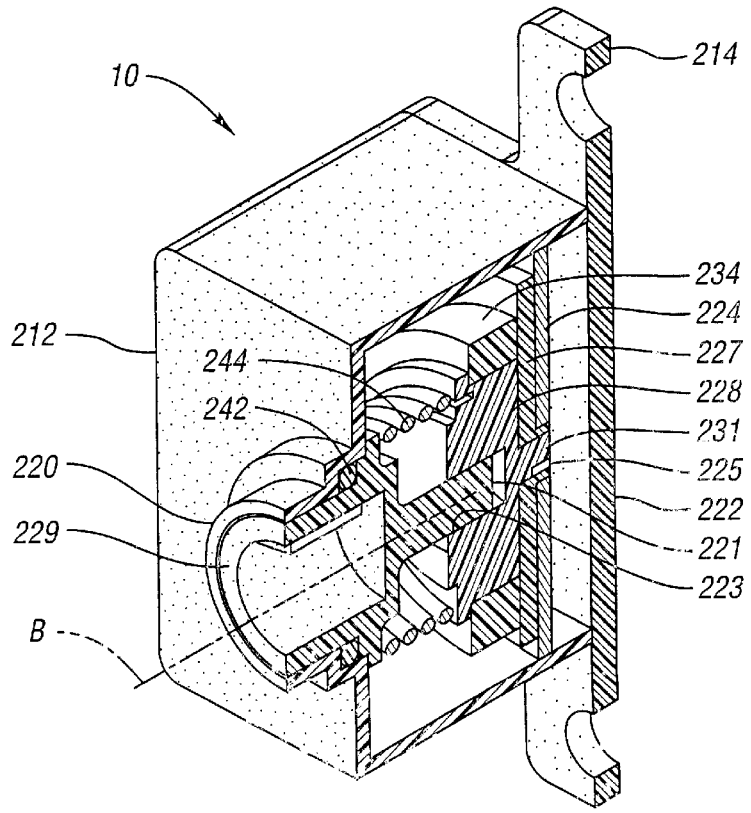
FIG. 3 is a sectioned isometric view of a second preferred embodiment of the electronic throttle control position sensor represented by FIG. 1A.
Figure 4:
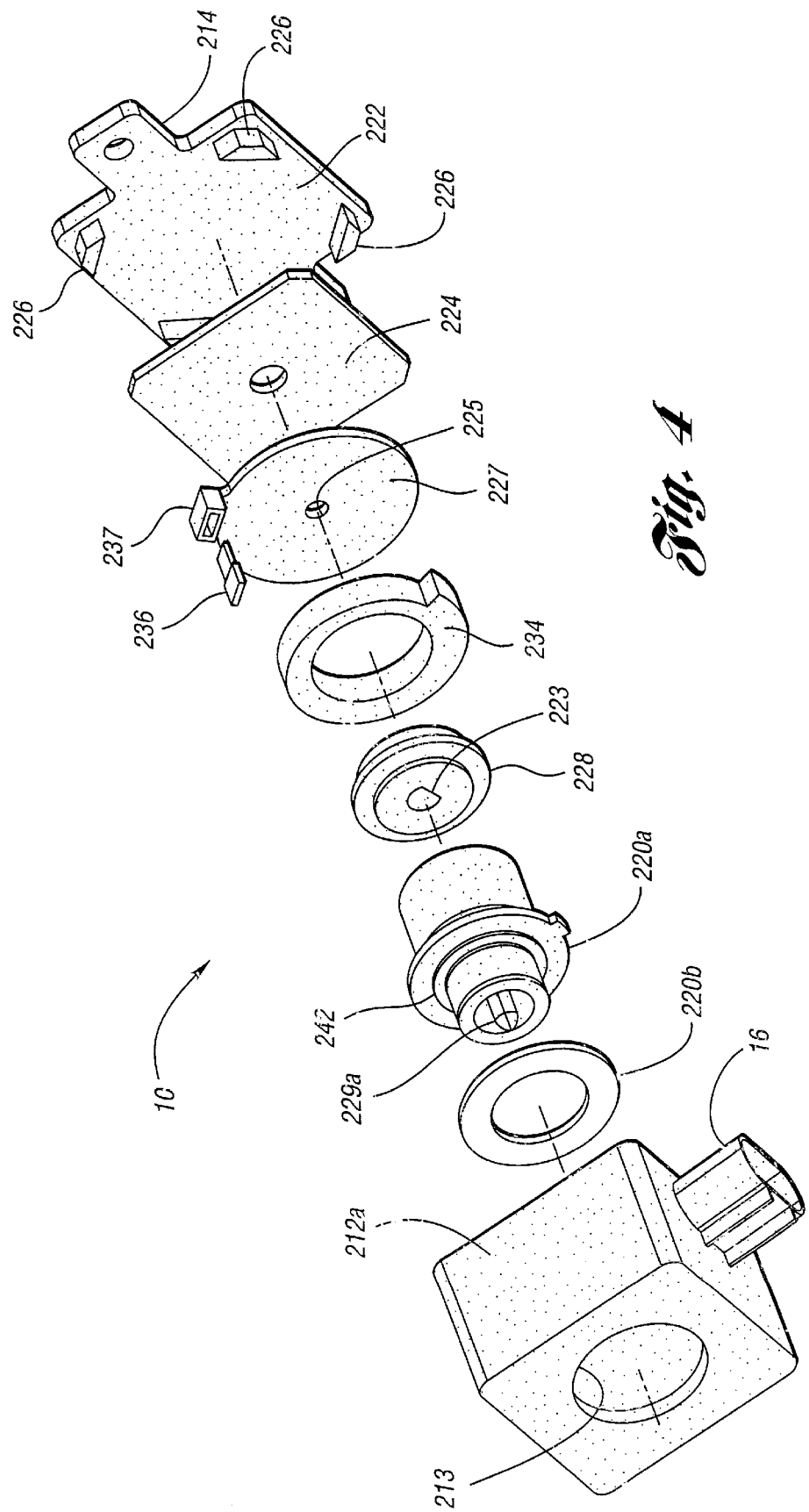
FIG. 4 is an exploded isometric view of the second preferred embodiment of the electronic throttle control position sensor represented by FIG. 1A.

FIG. 3 shows in section a portion of a second preferred embodiment of the electronic throttle control position sensor 10. It includes a housing 212 that has a tubular magnet rotor guide 220 extending therefrom. Disposed opposite the magnet rotor guide 220 is a housing plate 222, which provides access to components located within the housing 212. The housing plate 222 also includes mounting tabs 214. A printed circuit board 224 is secured to standoffs 226 extending from the housing plate 222 (FIG. 4). A sensor alignment plate 227 is disposed adjacent the printed circuit board. Located at the periphery of the sensor alignment plate is a sensor mount 237 (FIG. 4) within which a magnetic flux sensor (such as 236 in FIG. 4) is positioned to ensure its alignment is maintained.

A magnet rotor driver 229 extends through the magnet rotor guide 220 and is rotatable therein about a rotation axis B. The magnet rotor driver 229 has a driving end 221 that extends into a recess 223 in a magnet rotor 228, rotatably driving the magnet rotor 228 when the magnet rotor driver 229 is rotated. The magnet rotor 228 has a central circular portion 231 that is rotatably supported within a circular central aperture 223 in the sensor alignment plate 227. A magnet 234 (FIGS. 5A, 5B and 5C) having a configuration of a linear cam ring, whereby its radial thickness varies with its angular disposition, is mounted around a central portion of the magnet rotor 228 to rotate therewith. The magnet 234 is typically a permanent magnet, and it is magnetized in a radial direction relative to the axis of rotation B. It is rotatably mounted (FIG. 4) so that it is spaced from the magnetic flux sensor in a radial direction relative to the axis of rotation B. A rotation of the magnet 234 varies the gap between it and the magnetic flux sensor 236, thus varying the flux sensed by the magnetic flux sensor 236 as a function of the angular disposition of the magnet 234.

FIG. 4 shows an exploded view of an alternative version of the second preferred embodiment of the electronic throttle control position sensor 10. This version is similar to that shown in FIG. 3, but the magnet rotor guide is not formed as part of the housing 212a. Rather, it is formed of independent components. A portion of a magnet rotor guide 220a extends through a washer 220b, applying pressure to an annular seal 242 disposed therebetween when the extending portion of the magnet rotor guide 220a is installed through an aperture 213 in the housing 212a. A magnet rotor driver 229a has an alternate configuration that extends through the magnet rotor guide 220a and has a driving end (not shown) that engages the magnet rotor 228. The remainder of the device shown by FIG. 4 and the operation thereof is basically the same as those shown by FIG. 3.

FIGS. 5A, 5B and 5C are respectively axial, radial and isometric views of the magnet 234. It is preferably formed of thermoplastic with a hard magnetic filler intended for magnetization in anisotropic radial direction during injection molding.

Although devices have been developed for determining position as a function of magnetic flux density, commercially producing a sufficiently accurate and precise analog sensor for use in determining physical positions in that manner has proved to be difficult. The effects of variations in offset, input gain, temperature, output slope and output signal limiting placed severe constraints on the manufacturing of such sensing devices in an efficient and cost-effective manner. As a result, the use of high-volume, automated techniques has not been practical. Sensing devices made under these constraints tended to be either inaccurate and imprecise or costly and/or both.

FIG. 6 is a block diagram typical of a programmable Hall-effect integrated circuit 50 with two optional terminations 52 for communications. Temperature is measured by a temperature sensor 58 and internally compensated as indicated by the temperature compensation block 54. Programming offset voltage, gain and temperature compensation is performed as indicated by the calibration block 56. Examples of such integrated circuitry include AD22151 by Analog Devices and MLX90215 by Melexis. While the Hall-effect integrated circuit is preferred, a magnetoresistor, magnetodiode, magnetotransistor or similar sensing element with associated electronic circuitry having adjustable or programmable features including ratiometry, gain, offset voltage, temperature coefficient and output signal range limiting may also be used.

Using such circuits in combination with the elements claimed and described herein allow the use of magnetic components having only basic functional (family shape) requirements within a given range and having loose part-to-part conformity requirements. The magnetic profiles need only have a relatively precise functional shape, or magnetization flux density profile versus position and may vary widely in relative amplitude scaling and from magnetic component to component. In the case of a typical linear magnetic transfer function, the programmable capabilities of the electronic circuit allow for substantially wide, part-to-part magnetic component variations such that the slope, amplitude and offset of the magnetic transfer function need not be repeatable.

Rather, only the linearity of the magnetic transfer function between two defined endpoints is required of each magnetic component. The important feature, therefore, is not the magnitude of the precision magnetic field or even the magnitude at the endpoints but is the shape of the magnetic profile between the loosely defined endpoints. Accordingly, this makes possible cost effective, high-volume manufacturing of electronic position sensors such as that of the present invention, something that has been previously denied because the accuracy and precision requirements of the magnetic components were virtually impractical to meet.

Figure 7A:
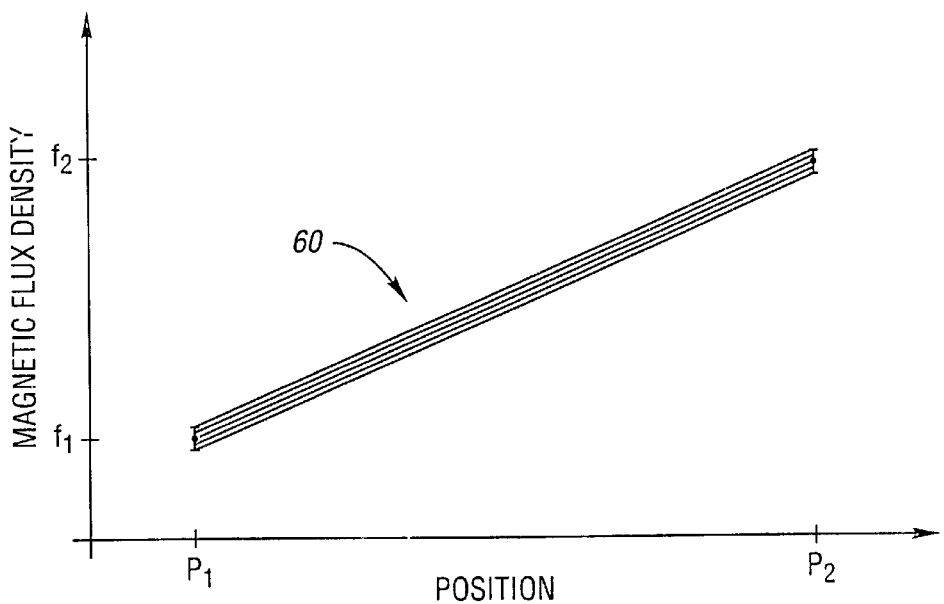
FIG. 7A is a graphic representation of a typical linear magnetic flux density profile of the prior art devices.

FIG. 7A graphically illustrates the typical magnetic transfer function requirements, generally indicated by the reference numeral 60, of prior art devices. The magnetic constraints are very difficult to achieve and often require cumbersome hardware adjustment means to bring the magnetic transfer function within specifications for an application.

Figure 7B:
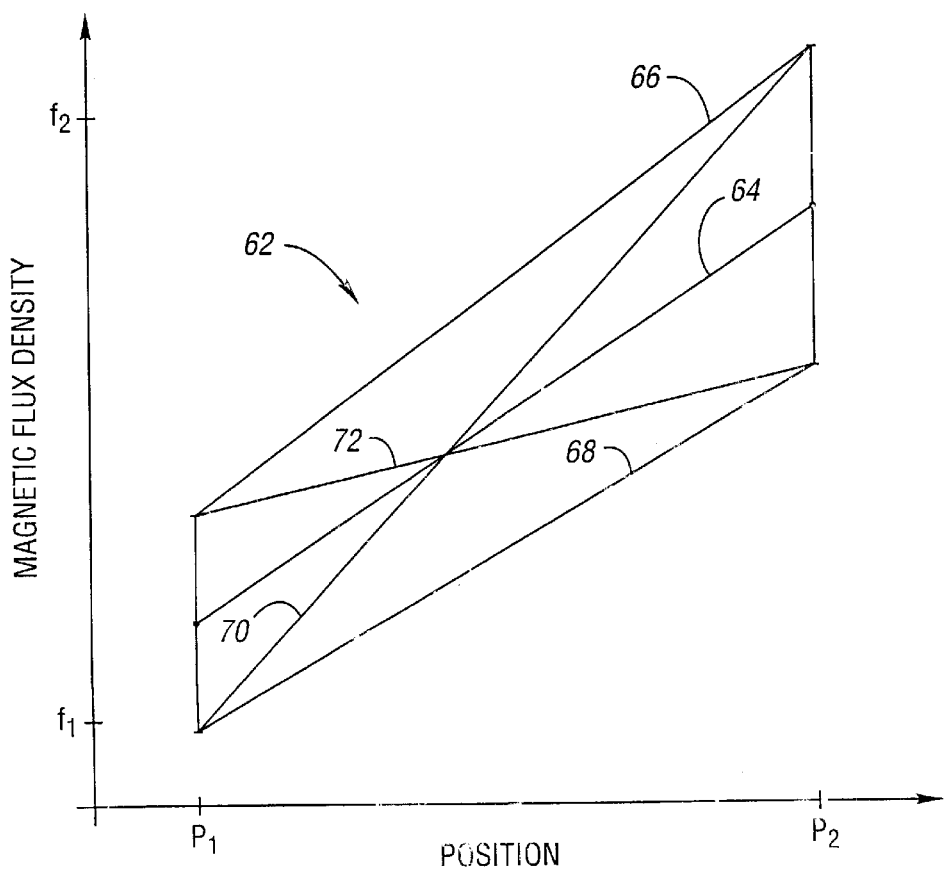
FIG. 7B is a graphic representation of a typical linear magnetic flux density profile of the present invention.

FIG. 7B graphically illustrates the magnetic transfer function requirements, generally indicated by the reference numeral 62, of the inventive design. Note, by comparison with FIG. 7A, that the magnetic manufacturing tolerances illustrated by FIG. 7B are greatly increased. Accordingly, the practical manufacturing constraints to highly automated production are greatly reduced. The nominal curve 64 may be shifted up to the highest curve 66 or shifted down to the lowest curve 68. The slope of the nominal curve 64 may be increased to a maximum slope 70 or decreased to a minimum slope 72. The gross increases in the tolerances of the magnetic transfer function are graphically shown by a comparison of FIG. 7A with FIG. 7B. The major significant constraint on the magnetic transfer function curve of FIG. 7B is only that it must maintain the same self-linearity as that of FIG. 7A, although part-to-part repeatability is not required as with FIG. 7A.

Figure 8B:
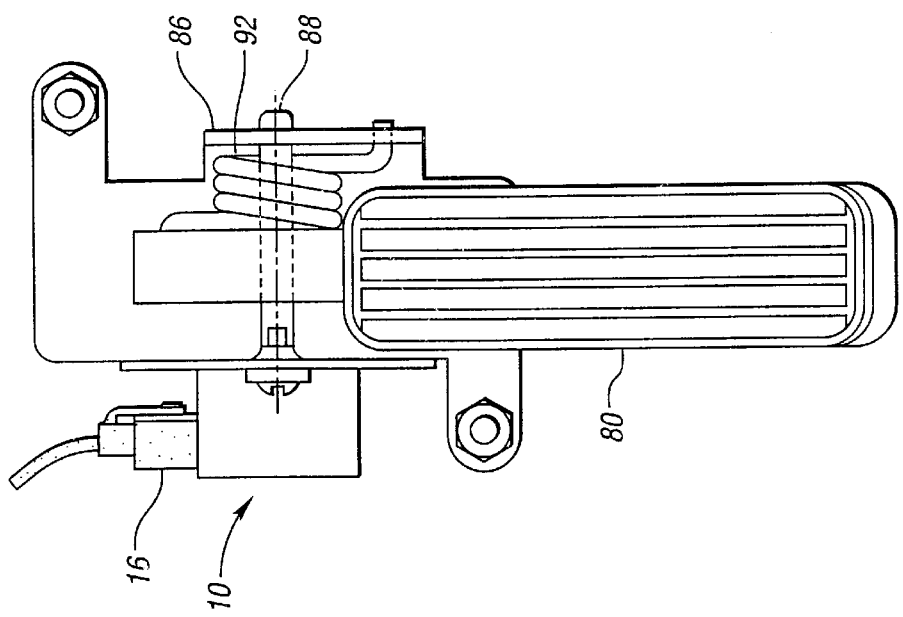
FIG. 8B is a forward-looking view of the automotive accelerator pedal mechanism and of the electronic throttle control position sensor of FIG. 8A.
Figure 8A:
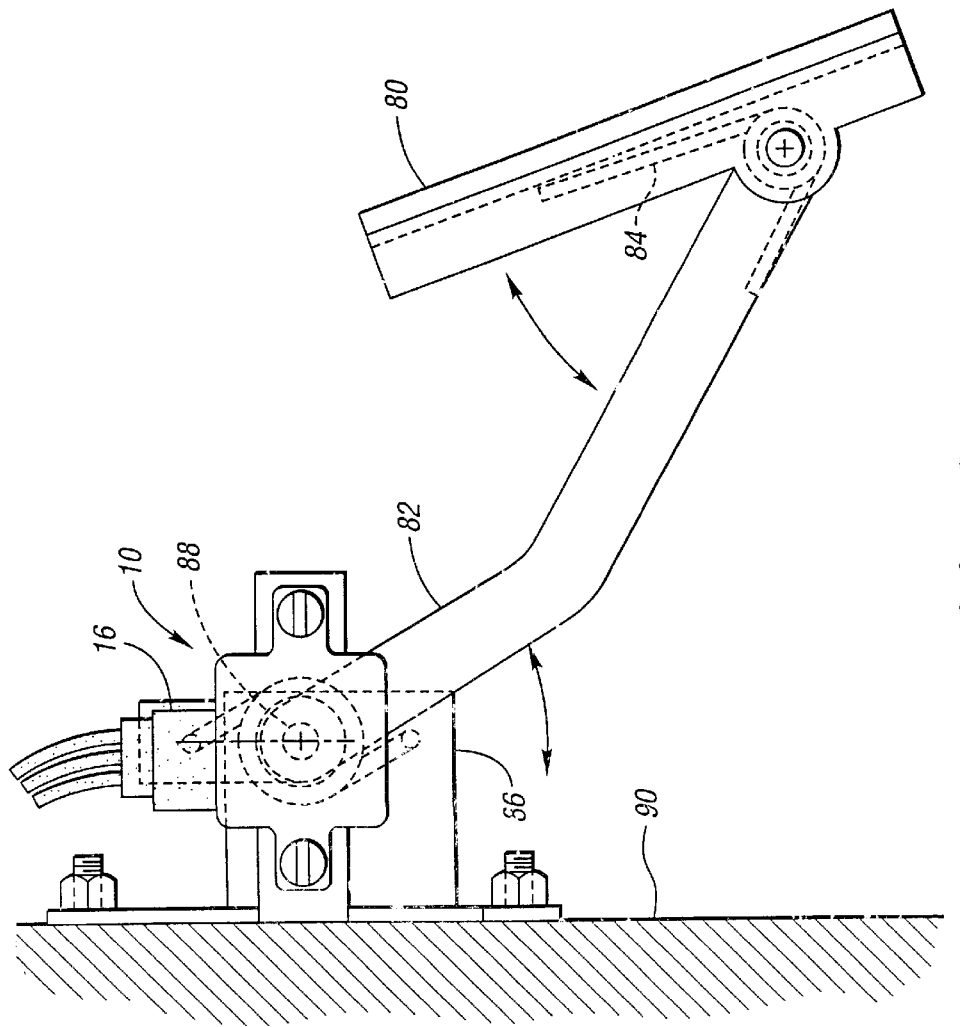
FIG. 8A is a side view of an automotive accelerator pedal mechanism showing the electronic throttle control position sensor in a first preferred position.

FIGS. 8A and 8B respectively show side and forward-looking views of a typical automotive accelerator pedal assembly and indicates the relative position of the electronic throttle control position sensor 10 of the present invention. Shown is an accelerator pedal 80 pivotally connected to a lower end of a pedal lever arm 82 and resiliently biased away therefrom by a pedal return spring 84. An upper end of the pedal lever arm 82 is pivotally supported by a lever arm pivot pin 88 extending through a bracket 86 mounted on a vehicle firewall 90. The pedal lever arm 82 is resiliently biased away from the firewall 90 by a pedal lever arm return spring 92. The electronic throttle control position sensor 10 is shown mounted at the lever arm pivot pin 88 to sense the angular position of the pedal lever arm 82.

Figure 9B:
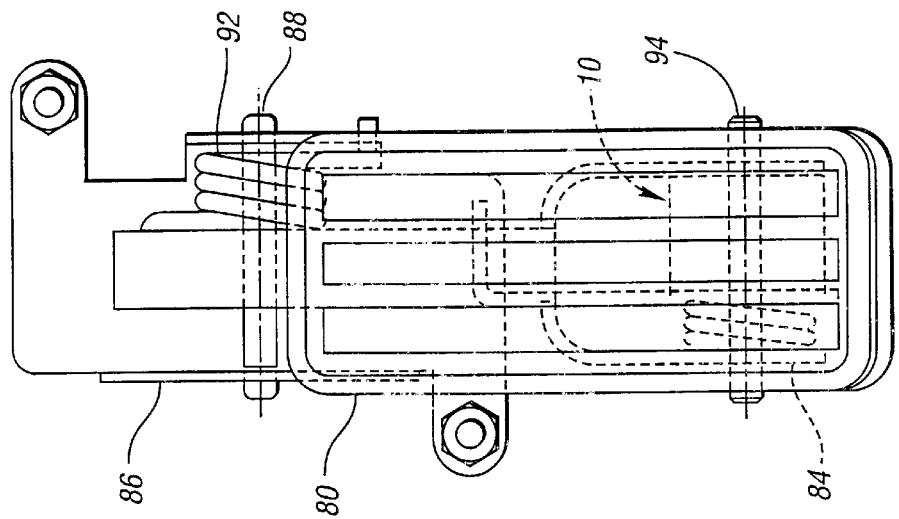
FIG. 9B is a forward-looking view of the automotive accelerator pedal mechanism and of the electronic throttle control position sensor of FIG. 9A.
Figure 9A:
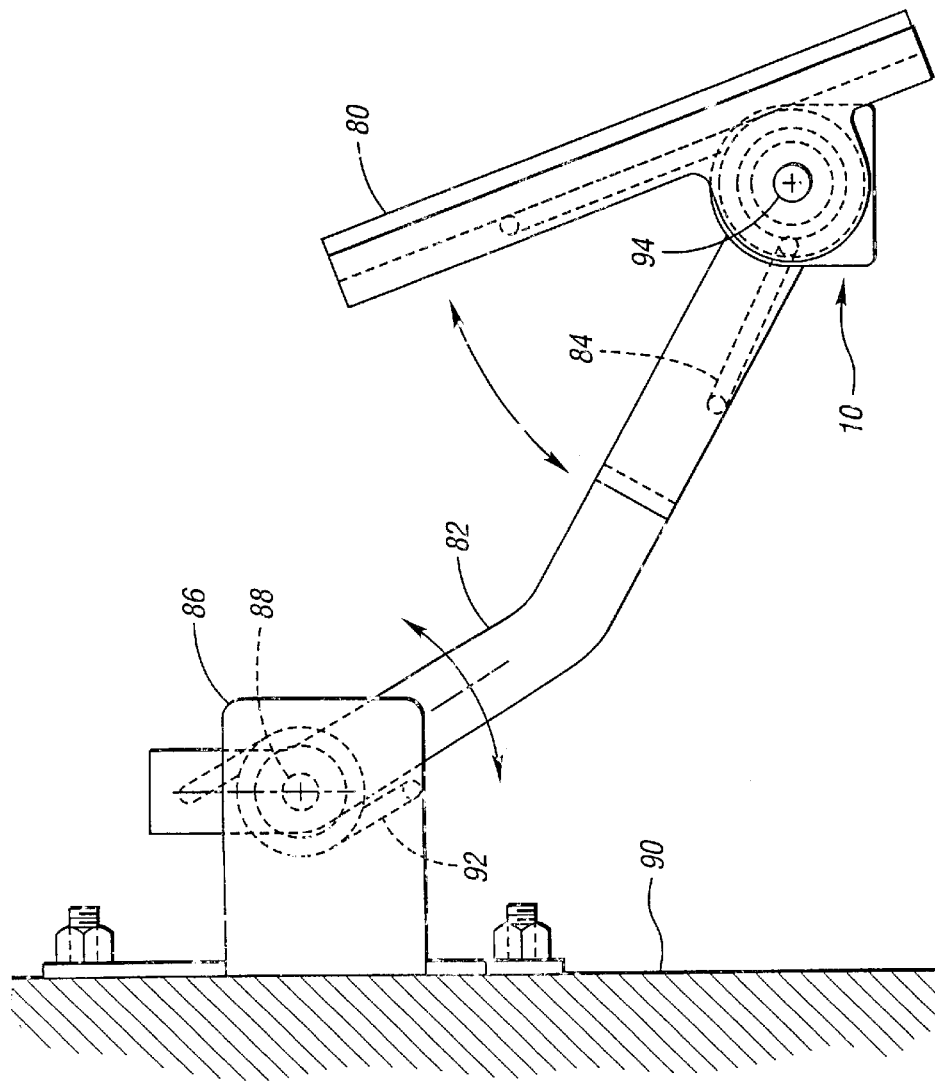
FIG. 9A is a side view of the automotive accelerator pedal mechanism showing the electronic throttle control position sensor in a second preferred position.

FIGS. 9A and 9B show the same views of an automotive accelerator pedal assembly as do FIGS. 8A and 8B except that the electronic throttle control position sensor 10 is shown mounted at an accelerator pedal pivot pin 94 to sense the angular position of the accelerator pedal 80.

It should be noted that a similar system could be applied to sensing linear, rotational, and other functional profiles for position sensing with the analog optionally converted to digital. Various known schemes can be utilized to communicate the output signal(s), including analog voltage, analog current, two-wire voltage or current, digital parallel, digital serial, and various bus and coding schemes. The applications of the electronic position sensor of the present invention are wide ranging and include, in addition to the automotive throttle and throttle pedal position sensor illustrated herein, valve position, suspension position, fuel level and engine coolant level sensing, and the like.

Examples of additional variations in magnet configuration, placement and movement are illustrated by FIGS. 10 through 16. Note that the term "magnet" used herein is construed to include a precision magnetized magnet, pole pieces, flux concentrators, and/or active magnetic field generating coils. Also note that, by using magnetic field generating coils (energized via conductive slip rings, flexible circuits, fixed static wiring, inductively coupled, capacitively coupled, electromagnetically coupled radiation, or light), dynamic pressure coupled (sonic or ultrasonic, and the like), with or without a permanent magnet, it is possible to provide a similar profile of controlled flux density versus position.

The use of flux concentrators and/or pole pieces with at least one controlled-current electromagnet can provide a desired flux density profile with or without the use of additional permanent magnetic material. Alternative embodiments include the use of two flux density sensors and a periodically varying magnetic field to function as an incremental encoder with enhanced resolution plus motion direction sensing. High reliability applications requiring dual output with checksum can utilize two programmable Hall-effect integrated circuits, each sensing either the same or a different magnetic component, each programmed differently and incorporating differing output impedances such that the two output signal voltages sum to some fixed value, for example, 5 volts.

Figure 10:
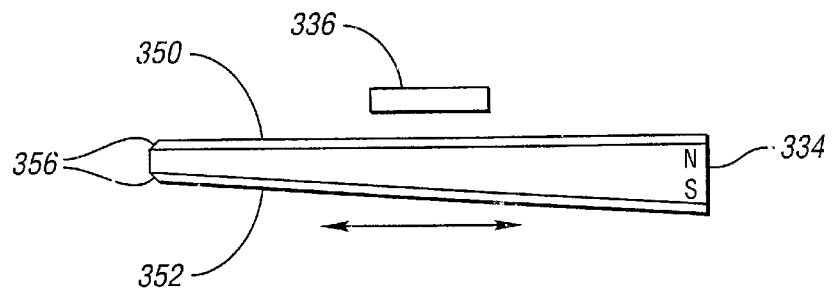
FIG. 10 is an edge view of a magnetic flux sensor and a side view of a linearly translatable elongate magnet.

FIG. 10 shows a magnetic flux sensor 336 and a linearly translatable elongate magnet 334 that is magnetized in the direction of the sensor 336, as indicated by the characters N and S (which represent north and south). The direction of relative motion between the magnet 334 and the magnetic flux sensor 336 is indicated by a double-headed arrow. The magnet 334 is shown having a pair of lateral surfaces, 350 and 352, disposed on opposite sides thereof. The lateral surface 350 facing the magnetic flux sensor 336 has a flat surface the plane of which is in the direction of relative motion. The opposite lateral surface 352 also has a flat surface, and it is inclined relative to that facing the magnetic flux sensor 336. Due to the relative inclination of the lateral surfaces, 350 and 352, the magnetic length between them varies monotonically relative to position along the magnet in the direction of the relative movement. Shown disposed on each lateral surface, 350 and 352, is a pole piece or a flux concentrator 356. These may optionally be on one or both surfaces. Also optionally, a flux concentrator (not shown) may be disposed between the magnet 334 and the magnetic flux sensor 336 or (also not shown) spaced from the lateral side 352 of the magnet 334.

In the example shown the gap between the magnetic flux sensor and the magnet 334 remains constant during the relative motion; however, the magnetic length varies. Accordingly, the flux density presented to the magnetic flux sensor 336 varies in response to the relative motion. Depending on the application, other embodiments represented by FIG. 10 may, for example, have the opposite lateral surface or both lateral surfaces, 350 and 352, diverging from the direction of relative motion. In another embodiment, the surfaces may be mutually parallel and the motion of the magnetic flux sensor 336 and/or of the magnet 334 may be toward or away from the other directly or at an acute angle. In a further embodiment, magnetic flux sensors may be disposed on opposite sides of the magnet.

Figure 11:
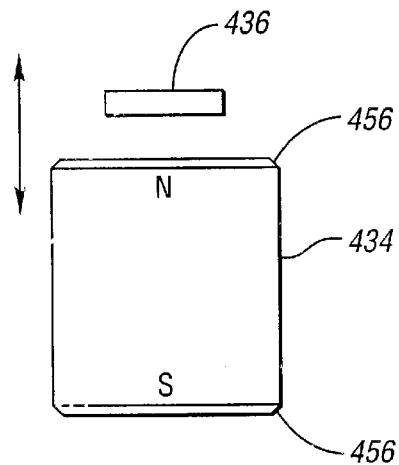
FIG. 11 is an edge view of a magnetic flux sensor and a side view of a linearly translatable magnet.

FIG. 11 shows a magnetic flux sensor 436 and an elongate magnet 434 that is magnetized, as indicated by the characters N and S, in the direction of the magnetic flux sensor 436. The magnetic length of the magnet 434 is uniform. The direction of relative motion between the magnet 434 and the magnet flux sensor 436 is indicated by a double-headed arrow. In this embodiment, the relative motion derives from a movement of the magnetic flux sensor 436 and/or the magnet 434 toward and away from each other, which varies the flux density presented to the magnetic flux sensor 436. Depending on application, the motion of the magnetic flux sensor 436 and/or of the magnet 434 may be toward or away from the other directly or alternatively at an acute angle. Shown disposed on each end surface of the magnet 434 is a pole piece or a flux concentrator 456. These may optionally be on one or both surfaces. Also optionally, a flux concentrator (not shown) may be disposed between the magnet 434 and the magnetic flux sensor 436 or (also not shown) spaced from the opposite end surface of the magnet 434.

Figure 12:
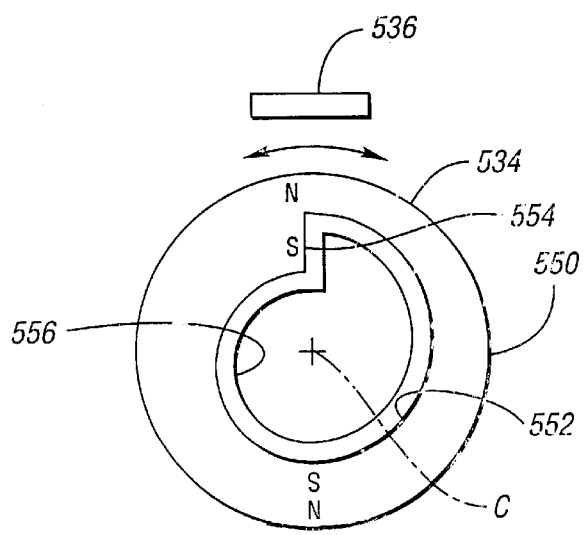
FIG. 12 is an edge view of a magnetic flux sensor and a side view of a radially magnetized magnet having a linear cam ring configuration.

FIG. 12 shows a magnetic flux sensor 536 and a rotatable magnet 534 having a linear cam ring configuration and, as indicated by the characters N and S, being radially magnetized. The radially outer surface 550 of the magnet shown is circular, and the radially inner surface 552 spirals radially inwardly toward the axis of rotation C of the magnet 534 from a cam step 554, the magnetic length between the two surfaces varying monotonically relative to the angular position about the axis of rotation where magnetic flux is to be sensed, the latter naturally excluding an angular position coinciding with the cam step 554. Relative motion between the magnet 534 and the magnetic flux sensor 536 may include the magnet 534 rotating about the axis of rotation C, the magnetic flux sensor 536 revolving around the axis of rotation C, or both. Depending on application, either or both of the radially outer and inner surfaces, 550 and 552, may be noncircular. Additionally, a magnetic flux censor 536 may be located outside or inside, or both outside and inside, the linear cam ring 534. Shown disposed on the radially inner surface 552 of the magnet 534 is a pole piece or a flux concentrator 556. This may optionally be on one or both of the radially outer 550 or radially inner 552 surfaces. Also optionally, a flux concentrator (not shown) may be disposed between the magnet 534 and the magnetic flux sensor 536 or (also not shown) spaced from the radially inner surface 552 within the confines of the magnet 534. A rubbing block or spacer (not shown) may be disposed between a noncircular or a nonlinear surface and a magnetic flux sensor 536 to maintain a constant gap when no polepiece or flux concentrator is present and the magnetic flux sensor 536 is resiliently biased toward the surface.

Figure 13:
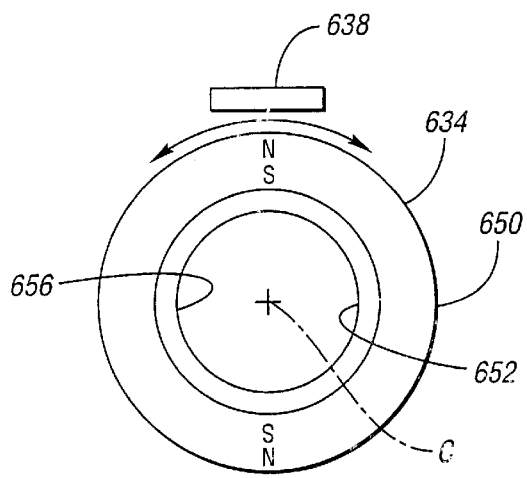
FIG. 13 is an edge view of a magnetic flux sensor and a side view of a radially magnetized magnet having a uniform ring configuration and an off-center axis of rotation.

The magnet shown in FIG. 13 is similar to that of FIG. 12 except that the magnet 634 is a linear ring and the magnetic length is thus uniform between its concentric radially outer and inner surfaces 650 and 652. The axis of rotation C of the magnet 634, however, is parallel to but spaced apart from the central geometric axis thereof. Relative motion between the magnet 634 and the magnetic flux sensor 636 may include the magnet 634 rotating about the axis of rotation C, the magnetic flux sensor 636 revolving around the axis of rotation C, or both. Shown disposed on the radially inner surface 652 of the magnet 634 is a pole piece or a flux concentrator 656. This may optionally be on one or both of the radially outer 650 and radially inner 652 surfaces. Also optionally, a flux concentrator (not shown) may be disposed between the magnet 634 and the magnetic flux sensor 636 or (also not shown) spaced from the radially inner surface 652 within the confines of the magnet 634.

Figure 14:
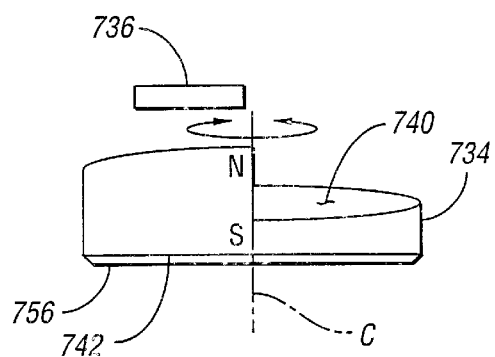
FIG. 14 is an edge view of a magnetic flux sensor and of an axially magnetized circular magnet having a linear cam on one surface.

The magnet shown in FIG. 14 is similar to that of FIG. 12 except that the magnet 734 has a cam surface 740 that extends axially, the magnetic flux sensor 736 being spaced axially from the cam surface 740. Relative motion thus results in a varying gap between the magnetic flux sensor 736 and the cam surface 740 of the magnet 734. Relative motion between the magnet 734 and the magnetic flux sensor 736 may include the magnet 734 rotating about the axis of rotation C, the magnetic flux sensor 736 revolving around the axis of rotation C, or both. Depending on application, either one or both axial surfaces may be cam, and a magnetic flux sensor 736 may be located facing either surface. Shown disposed on the flat surface 742 of the magnet 734 is a pole piece or a flux concentrator 756. This may optionally be on one or both of the flat surface 742 and the cam surface 740. Also optionally, a flux concentrator (not shown) may be disposed between the magnet 734 and the magnetic flux sensor 736 or (also not shown) spaced from the flat surface 742. This is also true for embodiments shown in the other figures.

Figure 15:
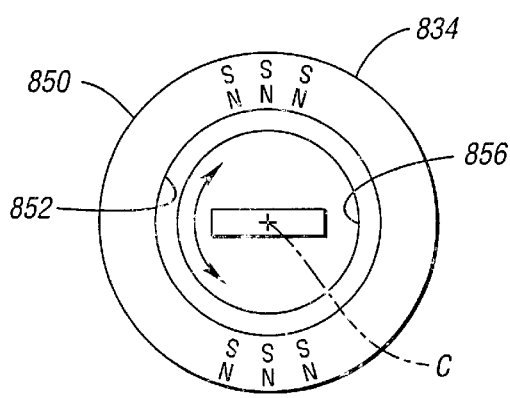
FIG. 15 is an edge view of a magnetic flux sensor and a side view of a diametrically magnetized magnet having a uniform ring configuration.

FIG. 15 shows a magnetic flux sensor 836 and a rotatable magnet 834 having a linear cam ring configuration and, as indicated by the characters N and S, being diametrically magnetized. Both the radially outer surface 850 and the radially inner surface 852 of the magnet 834 are circular and concentric about the axis of rotation C. The magnetic flux sensor 836 is centrally disposed. The magnet 834 is diametrically magnetized so that relative motion varies the angle between the flux lines and the magnetic flux sensor 836. Depending on application, relative motion between the magnet 834 and the magnetic flux sensor 836 may include the magnet 834 rotating about the axis of rotation C, the magnetic flux sensor 836 revolving around the axis of rotation C, or both. Shown disposed on the radially inner surface 852 of the magnet 834 is a pole piece or a flux concentrator 856. This may optionally be on one or both of the radially outer 850 and radially inner 852 surfaces. Also optionally, a flux concentrator (not shown) may be disposed between and spaced from the magnet 834 and the magnetic flux sensor 836 or (also not shown) spaced from the radially outer surface 850.

Figure 16:
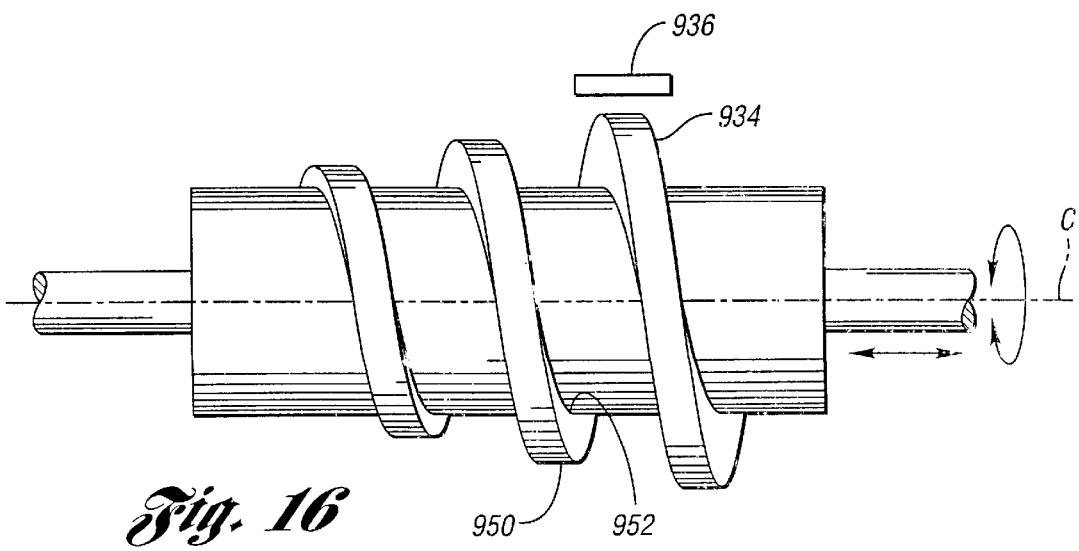
FIG. 16 is a side view of a magnetic flux sensor and of a radially magnetized magnet having a helical configuration.

FIG. 16 shows a magnetic flux sensor 936 and a magnet 934. The magnet 934 has a helical configuration and is rotatable, as indicated by the curved, double-ended arrow, about an axis C coinciding with the geometric axis of the magnet 934. The magnet 934 is also translatable, as indicated by the linear, double-ended arrow, along the same axis. The magnet 934 is radially magnetized and has a radially outer surface 950 and a radially inner surface 952. As shown, the distance from the axis of rotation C to the radially inner surface 952 is constant along the length of the magnet 934. The distance from the axis of rotation to the radially outer surface 950 changes linearly, thus the magnetic length varies monotonically along the length of the magnet 934. As the magnet 934 is rotated, it is simultaneously translated so that the magnetic flux sensor 936 always faces the radially outer surface 950. No pole pieces or flux concentrators are shown in FIG. 16, but one or both might optionally be disposed on the radially outer 950 and/or the radially inner surface 952. Likewise, a flux concentrator may be disposed between the magnet 934 and the magnetic flux sensor 936 or spaced from the magnet 934 opposite the magnetic flux sensor 936.

Depending on application, the distance from the axis of rotation C to the radially inner surface 952 and/or the distance from the axis of rotation C to the radially outer surface 950 may be inconstant. The shape of the helical magnet 934 may also be conical. Additionally, relative motion between the magnet 934 and the magnetic flux sensor 936 may include the magnet 934 rotating about the axis of rotation C, the magnetic flux sensor 936 revolving around the axis of rotation C, or both. Relative translatory motion may include linearly moving the magnet 934, the magnetic flux sensor 936, or both.

Since means for converting rotating, revolving and linear motions from one to another are well known in the art, FIGS. 10 through 16 and the descriptions of the embodiments shown thereby, do not include them.

Although the shown preferred embodiments of the inventions produce variations in magnetic flux density versus input mechanical rotation primarily due to changes in sensing gap between the magnet and the magnetic sensing component, other parameter variations can be equally well utilized to produce similar magnetic variations. Further considered and fully anticipated are numerous additional obvious mechanical and geometry means by which to similarly produce engineered variations in sensed magnetic flux density proximal to the sensing element due to sensor articulation including, varying changes in magnetic thickness near the sensing element, producing changes in magnetic orientation near the sensing element, and combinations including these with or without variations in air gap near the sensing element.

While embodiments of the invention have been illustrated and described in some detail, it is not intended that these embodiments illustrate and describe all possible forms of the invention. Rather, the words used in the specification are words of description rather than limitation; and it is understood that various changes may be made without departing from the spirit and scope of the invention.

What is claimed is:

1. An electronic position sensor for sensing the position of a movable member, the position sensor comprising:

a magnet providing a defined magnetic field; and at least one magnetic flux sensor disposed proximate the magnet, forming a gap therebetween, the at least one magnetic flux sensor including an electronic circuit having programmable gain, offset voltage and temperature compensation, relative motion being initiated between the magnet and the at least one magnetic flux sensor in response to movement of the movable member, the relationship between the position of the movable member and an electronic circuit output in response to magnetic characteristics sensed by the at least one magnetic flux sensor resulting in a function between two defined points within a specific range of at least one magnetic flux density, the amplitude of an electronic circuit output signal representing movable member position, wherein the at least one magnetic flux sensor comprises a programmable linear ratiometric Hall-effect integrated circuit having programmable gain, offset voltage and temperature compensation.

2. The electronic position sensor as defined by claim 1, wherein the magnet is an electromagnet.

3. The electronic position sensor as defined by claim 1, wherein the magnet is a permanent magnet having a configuration of a ring and having an axis of rotation, the magnet being magnetized in a radial direction relative to the axis of rotation, the magnet being rotatably mounted so that it is spaced from the at least one magnetic flux sensor in a radial direction to form a gap therebetween, the gap between the at least one magnetic flux sensor and the magnet varying in response to relative motion between the magnet and the at least one magnetic flux sensor about the axis of rotation.

4. The electronic position sensor as defined by claim 3, further including:
  a housing defining a cavity therewithin, the housing having a tubular magnet rotor guide extending therefrom;
  a magnet rotor driver extending through the magnet rotor guide and being rotatable therein about the axis of rotation, the magnet rotor driver having a driving end disposed within the housing; and
  a magnet rotor having a recess in which the driving end of the magnet rotor driver resides, the magnet rotor being rotatable with the magnet rotor driver about the axis of rotation, a peripheral portion of the magnet rotor being fitted within the ring-shaped magnet so that the magnet rotates with the magnet driver about the axis of rotation,
  the at least one magnetic flux sensor being mounted within the housing, spaced from the magnet in a radial direction with respect to the axis of rotation.

5. The electronic position sensor as defined by claim 4, further including:
  a sensor alignment plate mounted within the housing, the magnet rotor being resiliently biased toward the sensor alignment plate; and
  a sensor mount extending from the sensor alignment plate to maintain the at least one magnetic flux sensor in a desired alignment.

6. The movable member of claim 5, comprising an automotive accelerator pedal mechanism, the mechanism including:
  a mounting bracket;
  a lever arm pivot pin supported by the mounting bracket;
  an automotive accelerator pedal lever arm having an upper end and a lower end, its upper end being rotatably mounted on the lever arm pivot pin, the accelerator pedal lever arm being resiliently biased toward a rest position;
  an accelerator pedal pivot pin supported by the lower end of the accelerator pedal lever arm; and
  an accelerator pedal rotatably mounted on the accelerator pedal pivot pin, the accelerator pedal being resiliently biased toward a rest position, the electronic position sensor being operably connected to the lever arm pivot pin.

7. The movable member of claim 5, comprising an automotive accelerator pedal mechanism, the mechanism including:
  a mounting bracket;
  a lever arm pivot pin supported by the mounting bracket;
  an automotive accelerator pedal lever arm having an upper end and a lower end, its upper end being rotatably mounted on the lever arm pivot pin, the accelerator pedal lever arm being resiliently biased toward a rest position;
  an accelerator pedal pivot pin supported by the lower end of the accelerator pedal lever arm; and
  an accelerator pedal rotatably mounted on the accelerator pedal pivot pin, the accelerator pedal being resiliently biased toward a rest position, the electronic position sensor being operably connected to the accelerator pedal pivot pin.

8. The electronic position sensor as defined by claim 1, wherein the relative motion between the magnet and the at least one magnetic flux sensor is rotational, the magnet having an axis of rotation, having a configuration of a ring of uniform axial thickness, having radially inner and outer surfaces, and being radially magnetized, the magnet being rotatably mounted so that it is radially spaced from the at least one magnetic flux sensor and so that the at least one magnetic flux sensor faces one of the radially inner and outer surfaces, the magnetic length of the magnet between the radially inner and outer surfaces varying monotonically relative to angular position about the axis of rotation along a portion of the magnet where magnetic flux is to be sensed.

9. The electronic position sensor as defined by claim 1, wherein the relative motion between the magnet and the at least one magnetic flux sensor is rotational, the magnet having an axis of rotation, having a configuration of a ring, having inner and outer surfaces, and being radially magnetized, the magnet being rotatably mounted so that it is radially spaced from the at least one magnetic flux sensor and so that the at least one magnetic flux sensor faces one of the inner and outer surfaces, the magnetic length of the magnet between the inner and outer surfaces being uniform, the axis of rotation of the magnet being parallel to and spaced apart from a central geometric axis of the magnet.

10. The electronic position sensor as defined by claim 1, wherein the relative motion between the magnet and the at least one magnetic flux sensor is rotational, the magnet having an axis of rotation, having a circular configuration, having a pair of axially separated surfaces, at least one of the axially separated surfaces having a step and being disposed at a linearly increasing distance from the other of the pair of axially separated surfaces, the magnet being axially magnetized and being rotatably mounted so that it is axially spaced from the at least one magnetic flux sensor and so that the at least one magnetic flux sensor faces the at least one axially separated surface having the step, the magnetic length of the magnet between the axially separated surfaces varying monotonically relative to angular position about the axis of rotation along a portion of the magnet where magnetic flux is to be sensed.

11. The electronic position sensor as defined by claim 1, wherein the relative motion between the magnet and the at least one magnetic flux sensor is rotational, the magnet having an axis of rotation, having a configuration of a ring, having radially inner and outer surfaces, and being diametrically magnetized, the magnet being rotatably mounted with the at least one magnetic flux sensor centered at the axis of rotation and facing a portion of the radially inner surface, the relative motion varying the angle of the direction of magnetic flux relative to the at least one magnetic flux sensor.

12. The electronic position sensor as defined by claim 1, wherein the relative motion between the magnet and the at least one magnetic flux sensor is both rotational and linear, the magnet having an axis of rotation, having a configuration of a helix, having radially inner and outer surfaces, and being radially magnetized, the magnet being rotatable about and translatable along the axis of rotation and being mounted with the at least one magnetic flux sensor facing the radially outer surface, the magnetic length of the magnet between the radially inner and outer surfaces varying monotonically relative to angular position about the axis of rotation.

13. An electronic position sensor for sensing the position of a movable member, the position sensor comprising:
   a magnet providing a defined magnetic field; and
   at least one magnetic flux sensor disposed proximate the magnet, forming a gap therebetween, the at least one magnetic flux sensor including an electronic circuit having programmable gain, offset voltage and temperature compensation, relative motion being initiated between the magnet and the at least one magnetic flux sensor in response to movement of the movable member, the relationship between the position of the movable member and an electronic circuit output in response to magnetic characteristics sensed by the at least one magnetic flux sensor resulting in a linear function between two defined points within a specific range of at least one magnetic flux density, the amplitude of an electronic circuit output signal representing movable member position,
   wherein the magnet is a permanent magnet having a configuration of a uniformly thick circular plate having a plane surface and having a central axis of rotation, the plane surface of the magnet forming an oblique angle relative to the central axis of rotation, the direction of magnetization of the magnet being in a direction perpendicular to the plane surface, the magnet being rotatably mounted so that it is axially spaced from the at least one magnetic flux sensor to form a gap therebetween, the gap between the at least one magnetic flux sensor and the magnet varying in response to relative motion between the magnet and the at least one magnetic flux sensor about the central axis of rotation.

14. The electronic position sensor as defined by claim 13, further including:
   a housing defining a cavity therewithin, the housing having a tubular magnet rotor guide extending therefrom;
   a magnet rotor extending through the magnet rotor guide and being rotatable therein about the axis of rotation, the magnet rotor including a magnet mounting end disposed within the housing, the magnet mounting end having a circular recess in which is fixedly mounted the magnet, the magnet having a circular aperture extending centrally therethrough and centered about the axis of rotation; and
   a support member extending from a portion of the housing, the support member having a free end extending toward the circular aperture in the magnet, the support member having a circular cross section the diameter of which is larger than that of the diameter of the circular aperture in the magnet, the magnet rotor being resiliently biased in the direction of the support member, the free end of the support member being rounded to supportably accommodate the motion of the rotating magnet resulting from its angular disposition relative to the axis of rotation,
   the at least one magnetic flux sensor being mounted within the housing, spaced from the magnet in an axial direction relative to the axis of rotation.

15. The electronic position sensor as defined by claim 14, wherein the movable member includes an automotive accelerator pedal mechanism, the accelerator pedal mechanism comprising:
   a mounting bracket;
   a lever arm pivot pin supported by the mounting bracket;
   an automotive accelerator pedal lever arm having an upper end and a lower end, its upper end being rotatably mounted on the lever arm pivot pin, the accelerator pedal lever arm being resiliently biased toward a rest position;
   an accelerator pedal pivot pin supported by the lower end of the accelerator pedal lever arm; and
   an accelerator pedal rotatably mounted on the accelerator pedal pivot pin, the accelerator pedal being resiliently biased toward a rest position, the electronic position sensor being operably connected to the lever arm pivot pin.

16. The electronic position sensor as defined by claim 14, wherein the movable member includes an automotive accelerator pedal mechanism, the accelerator pedal mechanism comprising:
   a mounting bracket;
   a lever arm pivot pin supported by the mounting bracket;
   an automotive accelerator pedal lever arm having an upper end and a lower end, its upper end being rotatably mounted on the lever arm pivot pin, the accelerator pedal lever arm being resiliently biased toward a rest position;
   an accelerator pedal pivot pin supported by the lower end of the accelerator pedal lever arm; and
   an accelerator pedal rotatably mounted on the accelerator pedal pivot pin, the accelerator pedal being resiliently biased toward a rest position, the electronic position sensor being operably connected to the accelerator pedal pivot pin.

17. An electronic position sensor for sensing the position of a movable member, the position sensor comprising:
   a magnet providing a defined magnetic field; and
   at least one magnetic flux sensor disposed proximate the magnet, forming a gap therebetween, the at least one magnetic flux sensor including an electronic circuit having programmable gain, offset voltage and temperature compensation, relative motion being initiated between the magnet and the at least one magnetic flux sensor in response to movement of the movable member, the relationship between the position of the movable member and an electronic circuit output in response to magnetic characteristics sensed by the at least one magnetic flux sensor resulting in a linear function between two defined points within a specific range of at least one magnetic flux density, the amplitude of an electronic circuit output signal representing movable member position,
   wherein the relative motion between the magnet and the at least one magnetic flux sensor is linear, the magnet having a configuration longitudinally elongated in the direction of the relative motion and having a pair of oppositely disposed lateral surfaces, at least one lateral surface facing the at least one magnetic flux sensor, the magnet being magnetized in a direction perpendicular to the direction of relative motion and toward the at least one magnetic flux sensor, the magnetic length between the two lateral surfaces varying monotonically relative to position along the magnet in the direction of the relative motion.

18. An electronic position sensor for sensing the position of a movable member, the position sensor comprising:

a magnet providing a defined magnetic field; and at least one magnetic flux sensor disposed proximate the magnet, forming a gap therebetween, the at least one magnetic flux sensor including an electronic circuit having programmable gain, offset voltage and temperature compensation, relative motion being initiated between the magnet and the at least one magnetic flux sensor in response to movement of the movable member, the relationship between the position of the movable member and an electronic circuit output in response to magnetic characteristics sensed by the at least one magnetic flux sensor resulting in a linear function between two defined points within a specific range of at least one magnetic flux density, the amplitude of an electronic circuit output signal representing movable member position, wherein the relative motion between the magnet and the at least one magnetic flux sensor is linear, the magnetic length being uniform, the magnet being magnetized, and the direction of the relative motion being, along an axis passing through the at least one magnetic flux sensor and the magnet.

* * * * *